(12) United States Patent
Schulze et al.

(10) Patent No.: US 9,073,079 B2
(45) Date of Patent: Jul. 7, 2015

(54) METHOD AND DEVICE FOR THE ELECTROSTATIC SEPARATION OF OVERSPRAY

(75) Inventors: Herbert Schulze, Aidlingen (DE); Kersten Link, Grafenau (DE); Werner Swoboda, Boeblingen (DE); Erwin Hihn, Walddorfhaeslach (DE)

(73) Assignee: EISENMANN AG, Boeblingen, DE (US)

( * ) Notice: Subject to any disclaimer, the term of this patent is extended or adjusted under 35 U.S.C. 154(b) by 407 days.

(21) Appl. No.: 13/515,847

(22) PCT Filed: Nov. 24, 2010

(86) PCT No.: PCT/EP2010/007121
§ 371 (c)(1),
(2), (4) Date: Jul. 12, 2012

(87) PCT Pub. No.: WO2011/072797
PCT Pub. Date: Jun. 23, 2011

(65) Prior Publication Data
US 2013/0032088 A1    Feb. 7, 2013

(30) Foreign Application Priority Data
Dec. 15, 2009  (DE) .................... 10 2009 058 208

(51) Int. Cl.
*B03C 3/34* (2006.01)
*B05B 15/12* (2006.01)
*B03C 3/017* (2006.01)
*B03C 3/16* (2006.01)

(52) U.S. Cl.
CPC ............ *B05B 15/1244* (2013.01); *B03C 3/017* (2013.01); *B03C 3/16* (2013.01)

(58) Field of Classification Search
USPC ................ 55/DIG. 46; 95/57, 58; 96/15, 60; 118/326, 620
See application file for complete search history.

(56) References Cited

U.S. PATENT DOCUMENTS

| | | | |
|---|---|---|---|
| 2,509,276 A | 5/1950 | Ransburg et al. | |
| 2,579,440 A * | 12/1951 | Palmer .............................. | 96/40 |
| 3,537,238 A * | 11/1970 | Dungler ........................... | 96/58 |
| 4,229,187 A * | 10/1980 | Stockford et al. ................ | 95/77 |
| 4,405,342 A * | 9/1983 | Bergman .......................... | 95/69 |
| 4,543,908 A | 10/1985 | Walberg | |
| 6,086,675 A * | 7/2000 | Hamamoto et al. .......... | 118/620 |
| 2010/0291848 A1 * | 11/2010 | Swoboda et al. ............... | 454/53 |

FOREIGN PATENT DOCUMENTS

| | | |
|---|---|---|
| DE | 25 48 099 A1 | 5/1977 |
| DE | 28 41 395 A1 | 3/1980 |
| DE | 38 32 879 A1 | 4/1989 |

(Continued)

*Primary Examiner* — Duane Smith
*Assistant Examiner* — Sonji Turner
(74) *Attorney, Agent, or Firm* — Factor Intellectual Property Law Group, Ltd.

(57) ABSTRACT

A method and device for separating overspray from the cabin exhaust air of coating systems which is laden with overspray, wherein the overspray is taken up by an air flow and conveyed to an electrostatically operating separating device. There, the bulk at least of the solids is separated from the overspray at a separating area of at least one separating surface. A cohesive material web is used as a separating agent, which is disposed at least partly along the separating area of the at least one separating surface and during operation of the separating device is electrically conductive at least in the separating area of the at least one separating surface.

28 Claims, 7 Drawing Sheets

(56) References Cited

FOREIGN PATENT DOCUMENTS

| DE | 103 41 977 A1 | 6/2005 |
| DE | 10 2007 036 553 A1 | 2/2009 |
| JP | 61-028475 A | 2/1986 |
| WO | 90/07982 A1 | 7/1990 |

* cited by examiner

METHOD AND DEVICE FOR THE ELECTROSTATIC SEPARATION OF OVERSPRAY

RELATED APPLICATIONS

This application claims the filing benefit of International Patent Application No. PCT/EP2010/007121, filed Nov. 24, 2010, which claims the filing benefit of German Patent Application No. 10 2009 058 208.8 filed Dec. 15, 2009, the contents of both of which are incorporated herein by reference.

TECHNICAL FIELD AND BACKGROUND OF THE INVENTION

The invention relates to a method for separating overspray from the overspray-laden booth exhaust air of coating systems, particularly paint systems, in which the overspray is taken up by an air stream and conveyed to an electrostatically operating separating device where the bulk at least of the solids is separated from the overspray in a separating region of at least one separating surface.

The invention moreover relates to a device for separating overspray from the overspray-laden booth exhaust air of paint systems having
a) at least one separating surface along which the booth exhaust air can be conveyed and which provides a separating region and is connected to a terminal of a high voltage source;
b) an electrode device which is arranged in the air stream, is associated with the separating surface and is connected to the other terminal of the high voltage source.

The invention furthermore relates to a system for coating, particularly painting, objects, particularly vehicle bodies, having
a) a coating booth in which the objects can be acted upon by coating material and through which an air stream can be conducted, which takes up and removes resultant overspray particles of the coating material;
b) an electrostatically operating separating device.

When paints are applied manually or automatically to objects, a substream of the paint, which generally contains both solid bodies and/or adhesive agent as well as solvent, is not applied to the object. This substream is known among experts as "overspray". The overspray is taken up by the air stream in the paint booth and supplied for separation so that, if required, the air can be conveyed back to the coating booth after suitable conditioning.

Particularly in systems with a relatively high paint consumption, for example in systems for painting vehicle bodies, wet separation systems are preferably used. In commercially known wet separators, water flows together with the booth exhaust air coming from above to a nozzle accelerating the air stream. A swirling of the through-flowing booth exhaust air with the water takes place in this nozzle. During this procedure, the overspray particles largely pass over into the water so that the air exiting the wet separator has been substantially cleaned and the paint overspray particles remain separated in the water. They can then be recovered from this or disposed of.

In known wet separators, a relatively high amount of energy is needed to circulate the very large quantities of water required. Treating the rinsing water is costly due to the elevated use of paint-binding and detackifying chemicals and the disposal of paint sludge. Furthermore, as a result of the intensive contact with the rinsing water, the air absorbs a great deal of moisture which, in recirculating-air mode, in turn leads to a high energy consumption for treating the air.

SUMMARY OF THE INENTION

In contrast, in commercially known devices of the type mentioned at the outset, a dry separation process is used in that paint overspray particles which are entrained by the booth exhaust air flowing past are ionised by the electrode device and, owing to the electrical field established between the separating surface and the electrode device, migrate to the separating surface on which they are separated. The paint overspray particles adhering to the separating surface can then be stripped off this mechanically, for example, and transported away.

The cleaning effect of such separators is very good. However, for continuous operation, it is necessary to always ensure that a sufficiently strong electrical field can build up between the separating surface and the electrode device, which is only possible up to a certain layer thickness of paint overspray on the separating surface, since such a layer has an insulating effect. However, the necessary continuous removal of the paint overspray from the separating surface involves complex structural measures and can be prone to faults. It is moreover possible that overspray will react, harden or dry on the separating surface so that it can no longer be removed simply by being stripped off the separating surface.

An object of the present invention, therefore, is to provide a method, a separating device and a system of the type mentioned at the outset, which address these concerns.

This object may be achieved in the method of the type mentioned at the outset in that a cohesive material web is used as a separating agent, which is arranged at least partially along the separating region of the at least one separating surface and, during operation of the separating device, it is ensured that the material web is electrically conductive at least in the separating region of the at least one separating surface.

Therefore, according to the invention, a material web is used as a separating layer between the separating surface and the overspray so that this latter cannot come into contact with the separating surface. Such a separating agent constructed as a material web can simply be removed from the separating surface together with the overspray separated on it. The material web can be stationary on the separating surface or it can be moved over this.

The material web is easy to handle if it is flexible.

It was possible to achieve good results with a material web which comprises a cellulose material or a plastics material.

So that the material web cannot slide off the separating surface, it is favourable to provide the material web with an adhesive agent so that it adheres to the at least one separating surface at least in the separating region.

Adhesive agents which comprise a solvent, particularly water, are especially good. If necessary, water on its own can be an adequate adhesive agent.

An adhesive agent which comprises a methyl cellulose can create an adhesive agent with adhesive bonding properties. It is thus possible to ensure that the material web adheres reliably without restricting its simple removal.

If an electrically conductive adhesive agent is used, the material web can be made from a material which is itself not electrically conductive. In this case, paper has proven particularly advantageous.

If the material web is moved intermittently or continuously over the separating region of the separating surface in the flow direction of the air stream or against the flow direction of the air stream, the removal of overspray-laden material web and the advancement of unladen material web can be carried out in a continuous process.

It is favourable here if the material web is unwound intermittently or continuously from a roll. This ensures simple advancement of the material over a given time period.

The at least one separating surface can extend parallel to the horizontal plane or alternatively inclined to the horizontal plane.

The advancement of the material web can be effectively promoted if the at least one separating surface is provided by a strand of a continuously revolving belt, which strand faces the air stream. This can then be moved in the rotational direction together with the material web.

Alternatively, the at least one separating surface can be provided by a separating plate.

It is favourable if overspray-laden material web portions are supplied to a collecting tank. The laden material can then be simply removed and supplied for treatment.

In a device of the type mentioned at the outset, the object described above can be achieved in that c) a cohesive material web is arranged at least partially along the separating region of the at least one separating surface as a separating agent, wherein the material web is kept electrically conductive during operation of the separating device, at least in the separating region of the at least one separating surface.

The statements regarding the method above apply in relation to the separating agent and the material web.

In terms of the adhesive agent, it is favourable if a coating device is provided which can provide the material web with adhesive agent so that the material web adheres to the at least one separating surface. In other respects, the statements regarding the method above likewise apply to the adhesive agent.

For the above-mentioned movement of the material web, it is advantageous if a supply device is provided by means of which the material web can be moved intermittently or continuously over the separating region of the separating surface in the flow direction of the air stream or against the flow direction of the air stream.

The statements regarding the method above also apply to the at least one separating surface.

In the system mentioned at the outset, the object described above may be achieved in that c) the electrostatic separating device is constructed according to one of the embodiments disclosed herein.

The system according to the invention therefore comprises a separating device having one or more of the features mentioned above in relation to the device. The advantages which can be achieved thereby correspond to the advantages explained above in relation to the method and to the device.

It is to be understood that the aspects and objects of the present invention described above may be combinable and that other advantages and aspects of the present invention will become apparent upon reading the following description of the drawings and detailed description of the invention.

BRIEF DESCRIPTION OF THE DRAWINGS

Exemplary embodiments of the invention are explained in more detail below with reference to the drawings, which show.

DETAILED DESCRIPTION OF THE PRESENT INVENTION

While this invention is susceptible of embodiment in many different forms, there is shown in the drawings and will herein be described in detail one or more embodiments with the understanding that the present disclosure is to be considered as an exemplification of the principles of the invention and is not intended to limit the invention to the embodiments illustrated.

Figure 1:
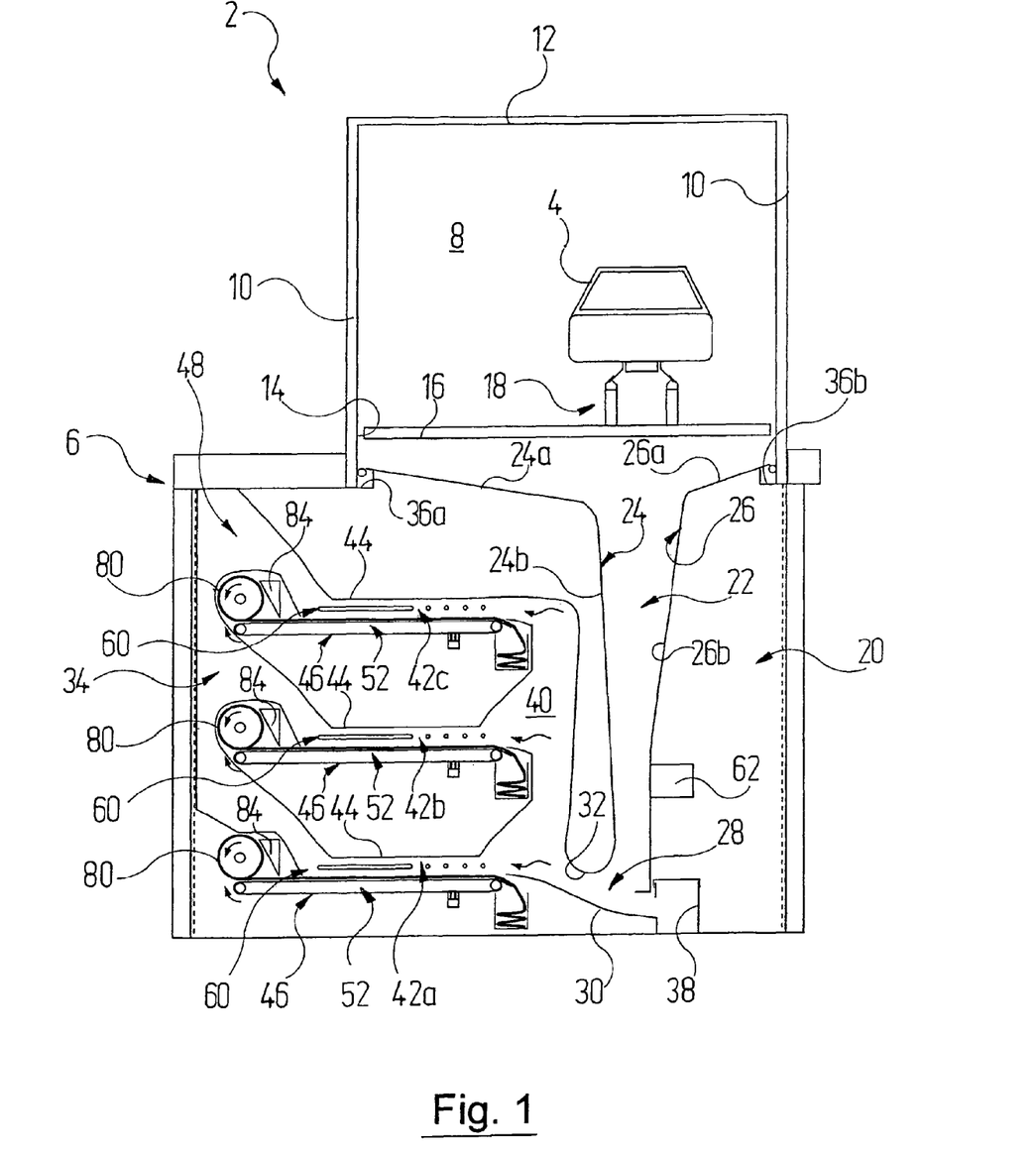
FIG. 1 a paint booth of a surface treatment system with a first exemplary embodiment of an overspray separating device in a front view.
Figure 2:
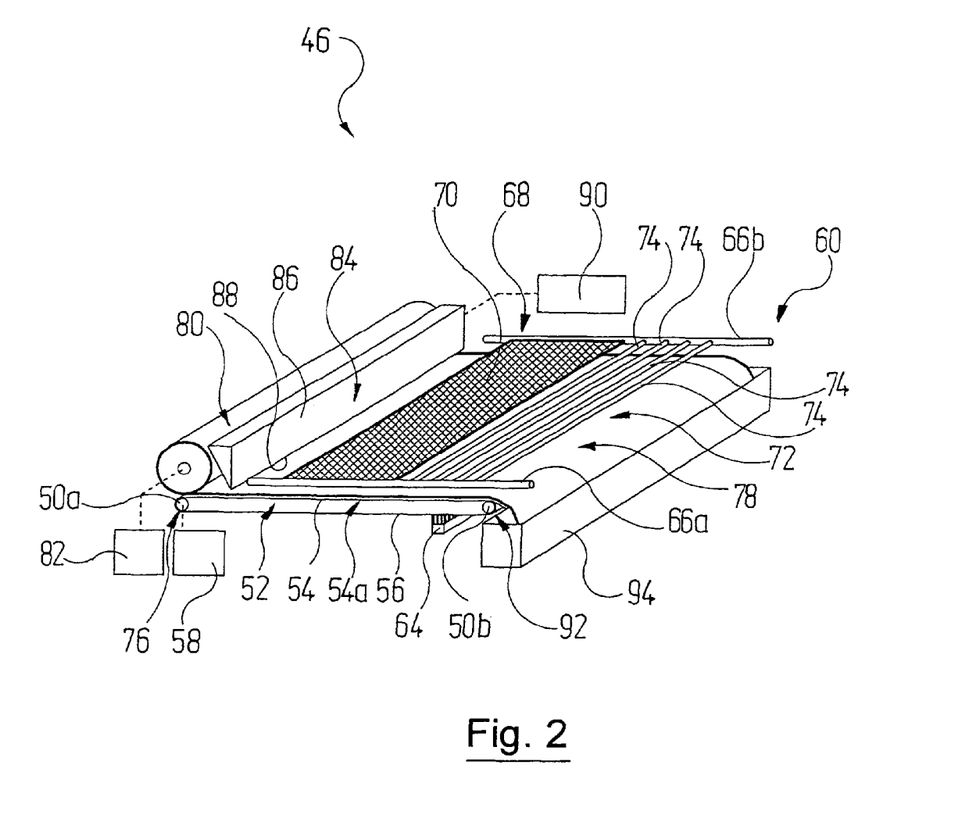
FIG. 2 a perspective view of an individual separating unit with an individual electrode device of the separating device of FIG. 1.

Reference is firstly made to FIGS. 1 and 2. In these, 2 denotes a paint booth, as a whole, of a surface treatment system in which vehicle bodies 4 are painted after they have been cleaned and degreased, for example, in pre-treatment stations (not shown specifically) arranged upstream in the paint booth 2. The paint booth 2 rests on a steel structure 6 which is known per se.

The paint booth 2 comprises a paint tunnel 8, which is arranged at the top and is delimited by vertical side walls 10 and a horizontal booth ceiling 12, but is open at the end faces and towards the bottom such that overspray-laden booth exhaust air can flow downwards. The booth ceiling 12 is constructed in conventional manner as a lower delimitation of an air supply chamber (not illustrated) with a filter cover.

At the height of the lower opening 14 of the paint tunnel 8, which is flanked by the lower edges of the side walls 10, a steel structure 16 is arranged which supports a conveyor system 18 which is known per se and is not explained in further detail here. This can be used to transport vehicle bodies 4 to be painted from the entry side of the paint tunnel 8 to its exit side. Application devices (not shown specifically), by means of which the vehicle bodies 4 can be acted upon by paint in a manner known per se, are located inside the paint tunnel 8. The lower opening 14 of the paint tunnel 8 is covered by an accessible grating (not shown specifically).

A system region 20 in which the overspray particles which are entrained by the booth air are separated from the booth air is located below the paint booth 2. The system region 20 is delimited by a housing which is not provided with a specific reference numeral and is merely indicated by dashed lines in FIG. 1.

The system region 20 comprises a flow region 22 which is open at the top towards the paint booth 2 and is produced by two air deflectors 24 and 26. The left air deflector 24 in FIG. 1 comprises a portion 24a which, from the outside in, has an initially moderate downward incline and merges into a portion 24b with a steep downward slope. The right air deflector 26 in FIG. 1 correspondingly has a portion 26a with a relatively slight downward incline and a steep portion 26b.

The air deflectors 24 and 26 lead downwards into a deflection region 28 in which a lower deflector 30 and a curved portion 32 continuing on from the air deflector 24 ensure that the booth air flowing from top to bottom in FIG. 1 flows to the left into a system region 34 arranged next to the flow region 22.

From distribution channels 36a, 36b mounted laterally adjacent to the air deflectors 24 and 26, a separating fluid can flow onto the air deflectors 24 and 26 and downwards in a substantially cohesive layer along their outer surface facing the paint booth 2. The separating fluid takes up some of the overspray entrained by the booth air whilst the booth air flows downwards from the paint booth 2 to the deflection region 28.

The overspray-laden separating fluid flows over the lower deflector 30 into a collecting tank 38 arranged on that side of the air deflector 26 which is remote from the system region 34. From there, the separating fluid can be supplied to a cleaning and treatment process in which it is freed of the paint overspray in a manner known per se. The separating fluid can then be circulated back to the distribution channels 36.

The system region 34 comprises a distribution chamber 40 which conducts the booth air coming from the deflection region 28 into three separating chambers 42a, 42b, 42c which are arranged above one another and are each delimited at the top by an air deflector 44. The air deflectors 44 are made of an insulating material.

Each separating chamber 42a, 42b, 42c is delimited at the bottom by a plurality of separating units 46 of an electrostatically operating separating device 48 which are arranged in succession in the longitudinal direction of the paint booth 2. The operating temperature of the separating device 48 is normally below 28° C. A separating unit 46 is shown again in detail in FIG. 2.

After the booth air has flowed through the separating device 48 and the separating chambers 42a, 42b, 42c in a substantially horizontal direction from right to left in FIG. 1, it is conveyed to an air-conditioning device (not shown) by means of which the cleaned air is brought back to the correct temperature and humidity so that it can again be conducted to the air supply chamber above the paint booth 2 where it is mixed with unused fresh air if required.

Each separating unit 46 comprises a separating belt 52 which revolves on two rollers 50a, 50b and has a separating strand 54 which faces the associated separating chamber 42 and a return strand 56 which is remote from the associated separating chamber 42. The separating belt 52 is driven by a motor 58 which cooperates with the roller 50a and is only shown in FIG. 2.

The separating units 46 are arranged in each separating chamber 42a, 42b, 42c in such a way that the separating strand 54 of the respective separating belts 52 are aligned with one another.

Each separating unit 46 comprises an electrode device 60 which is arranged parallel to the separating strand 54 of the separating belt 52, whilst observing a spacing.

Each electrode device 60 is connected to a terminal of a high voltage source 62 associated therewith, of which only one is indicated schematically in FIG. 1. The separating belt 52 is connected, by way of a sliding brush contact 64, to the terminal of the high voltage source 62 which is at ground potential and contacts the return strand 56 of the separating belt 52. In addition, the separating belt 52 can be made from an electrically insulating material, for example an electrically insulating plastic.

In a modification, all electrode devices 60 can also be supplied by a single common high voltage source.

Each electrode device 60 comprises two linear, mutually parallel-extending electrode strips 66a, 66b (see FIG. 2). These hold a grid electrode 70 in a field portion 68 of the electrode device 60, whereof the edges extending between the electrode strips 66a, 66b are perpendicular thereto. In a corona portion 72 of the electrode device 60, the electrode strips 66a, 66b hold a plurality of corona wires 74 acting as a discharge electrode. The corona wires 74 extend perpendicularly to the electrode strips 66a, 66b in a plane specified thereby and are arranged at equal spacings from one another.

The number of corona wires 74 of the electrode device 60 and their spacing from one another can vary depending on the separation behaviour of the overspray particles. In the present exemplary embodiment, four corona wires 74 are provided per electrode device 60.

The region of the separating strand 54 of the separating belt 52 at which the overspray can separate defines a separating region 54a of the separating strand 54 of the separating belt 52.

At a first end 76 of the separating belt 52, its separating strand 54 is supplied with a separating agent in the form of a material web 78. Using the material web 78 as a separating agent prevents separated overspray from depositing on the separating strand 54 of the separating belt 52. The material web 78 can be unwound from a wound roll 80 for this purpose. To this end, the wound roll 80 can be rotated about its longitudinal axis by means of a motor 82 which is only shown in FIG. 2. The wound roll 80 is rotatably mounted such that it is accessible from the outside to enable it to be replaced with a new wound roll 80 when it has been unwound completely.

In the present exemplary embodiment, a paper web 78 is used which is unwound from a paper roll 80. Cellulose materials are essentially suitable, although it is alternatively also possible to use a plastics material.

To ensure that the paper web 78 adheres to the separating strand 54 of the separating belt 52, a coating device 84 by means of which the paper web 78 is acted upon by an adhesive agent 86 is arranged between the wound roll 80 and the electrode device 60. This is also necessary for materials other than paper. To this end, the coating device 84 has a delivery slot 88 which can be opened or closed in controlled manner so that it is possible to adjust the quantity of adhesive agent which is delivered. Alternatively, the coating device 84 can also be constructed for example in the manner of a pasting machine as is known per se.

The sliding brush contact 64 is in any case arranged so that the material web 78 and, where applicable, the adhesive agent 86 is at ground potential.

The coating device 84 is earthed and is supplied by an adhesive agent reservoir 90 which is only shown in FIG. 2. In practice, a water/methyl cellulose mixture has proven effective as an adhesive agent 86, particularly in conjunction with a paper web 78. If required, water alone can also be an adequate adhesive agent 86. Solvents other than water are also alternative options.

The paper web 78 is saturated by the adhesive agent 86 so that the adhesive agent 86 passes between the paper web 78 and the upper strand 54 of the separating belt 52.

The paper web 78 has to be electrically conductive in the region where overspray needs to be separated. If a material web made of plastics material is used, it is optionally possible to use an electrically conductive plastics material. If the paper web 78 or other material webs 78 are not made from materials which are inherently electrically conductive, the electrical conductivity is generated by the adhesive agent 86 which has to be electrically conductive for this. The conductivity of the separating agent is essentially such that a charge can flow and is preferably in the range of 50 to 5000 µS/cm, particularly 1000 to 3000 µS/cm. If required, the conductivity of the separating agent can be adjusted by adding substances to the adhesive agent 86, for example salts.

Arranged at the second end 92 of the separating belt 52, which is opposite the paper roll 80, there is a collecting tank 94 into which paper of the paper web 78 which is laden with separated overspray arrives after it has been moved over the separating region 54a of the separating belt 52.

If required, a cutting device (not illustrated specifically here) can be arranged in the region of the collecting tank 94 so that paper portions which are laden with separated overspray can be cut from the paper web 78 at regular intervals and then fall into the collecting tank 94.

The paint booth 2 described above now functions as follows:

When painting the vehicle bodies 4 in the paint tunnel 8, the booth air located there is laden with paint overspray particles. These can still be liquid and/or tacky, or they can be more or less solid. The booth exhaust air which is laden with paint overspray flows through the lower opening 14 of the paint tunnel 8 into the first flow region 22 of the lower system region 20. This air is conducted there to the deflection region 28 by means of the air deflectors 24, 26, with some of the overspray already having been taken up by the separating fluid flowing down on the air deflectors 24, 26.

The booth air is deflected through the deflection region 28 in the direction of the distribution chamber 40 and from there into the separating chambers 42a, 42b, 42c with the separating units 46, where it flows through between the separating strand 54 of the respective separating belt 52 or the paper web 78 arranged thereon and the respective upper air deflector 44.

Corona discharges take place at the corona wires 74 of the electrode devices 60 in a manner known per se, which results in effective ionisation of the overspray particles in the booth exhaust air flowing past.

The ionised overspray particles pass over the separating belt, 52 which is at ground potential, and the grid electrodes 70 in the field portion 68 of the electrode devices 60. As a result of the electrical field established between the corona wires 74 and the grid electrode 70 and the separating belt 52, the ionised overspray particles separate on the paper web 78 in the separating region 54a of the separating strand 54 of the separating belt 52 and, for the most part, remain adhered to the paper web 78.

Most of the ionised overspray particles are already separated on the separating belt 52 or the paper web 78 in the corona portion 72 of the electrode devices 60. The electrical field which is present between the corona wires 74 and the respective separating belt 52 of each separating unit 46 is, however, more inhomogeneous than the electrical field in the region of the respective grid electrode 70, which is why a more targeted separation of the ionised overspray particles takes place on the corresponding separating belt 52. As a result, the overspray particles which have passed over the corona portion 72 are also effectively separated in the field portion 68.

As mentioned above, the air which is cleaned as it passes through the separating units 46 is supplied back to the paint tunnel 8 after a certain conditioning.

During operation of the separating device 48, the wound rolls 80 are continuously unwound and the unwound paper web 78 is continuously saturated with the electrically conductive adhesive agent 86 by the coating device 84. The separating belt 52 is operated by means of the motor 58 at a rotational speed which corresponds to the rate of advance of the paper web 78 so that the paper web 78 and the upper separating strand 54 of the separating belt 52 move in the direction of the collecting tank 94 at the same speed. The rotational directions of the wound rolls 80 and the separating belts 52 are shown in FIG. 1 by corresponding curved arrows.

The paper web 78 is thus conveyed by means of the separating belt 52 in the direction of the collecting tank 94 and moves against the flow direction of the booth air, which is indicated by wavy arrows in FIG. 1.

In practice, it was already possible to achieve good results at speeds of the paper web 78 and separating belt 52 from 0.01 m min$^{-1}$. With a greater quantity of overspray, the speed can be increased to values of up to 5 m min$^{-1}$.

In the separating region 54a of the separating strand 54 of the separating belt 52, overspray separates on the paper web 78 and is moved continuously out of the separating region 54a by the advancing movement of the paper web 78.

Alternatively, the paper web 78 can also be unwound intermittently from the paper roll 80. In this case, the paper web 78 firstly remains without being advanced on the separating strand 54 of the separating belt 52, which in turn is likewise stationary.

For correct operation of the separating unit 46, it is necessary to ensure that a sufficiently strong electrical field can build up between the separating belt 52 and the electrode devices 60, which is only possible up to a certain layer thickness of separated paint overspray on the paper web 78 since such a layer has an insulating effect.

Moreover, solid particles from the separated overspray migrate inside the paper webs 78 from their surface. After a certain operating period, there is a risk that solid particles, and especially adhesive-agent constituents, will migrate as far as the separating strand 54 of the separating belt 52 and deposit there, which would have a substantial adverse effect on the functional capability of the separating unit 46 and necessitate costly cleaning and maintenance.

This problem does not arise if the paper web 78 is moved continuously over the separating region 54a of the separating strand 54.

With a temporarily stationary paper web 78, the corona current can be used as an indicator for the loading of the separating strand 54 or the paper web 78 with overspray. The insulating effect of the overspray adhering to the paper web 78 causes the corona current to reduce as the thickness of the overspray layer increases. The corona current limit is generally determined empirically and is normally several milliamperes per electrode device 60.

Therefore, if replacement of the overspray-laden paper web 78 is indicated, the wound roll 80 and the separating belt 52 are driven synchronously until the overspray-laden portion of the paper web 78 has been conveyed into the collecting tank 94. The separating region 54a of the separating strand 54 is then covered with unladen paper web 78 again.

Figure 3:
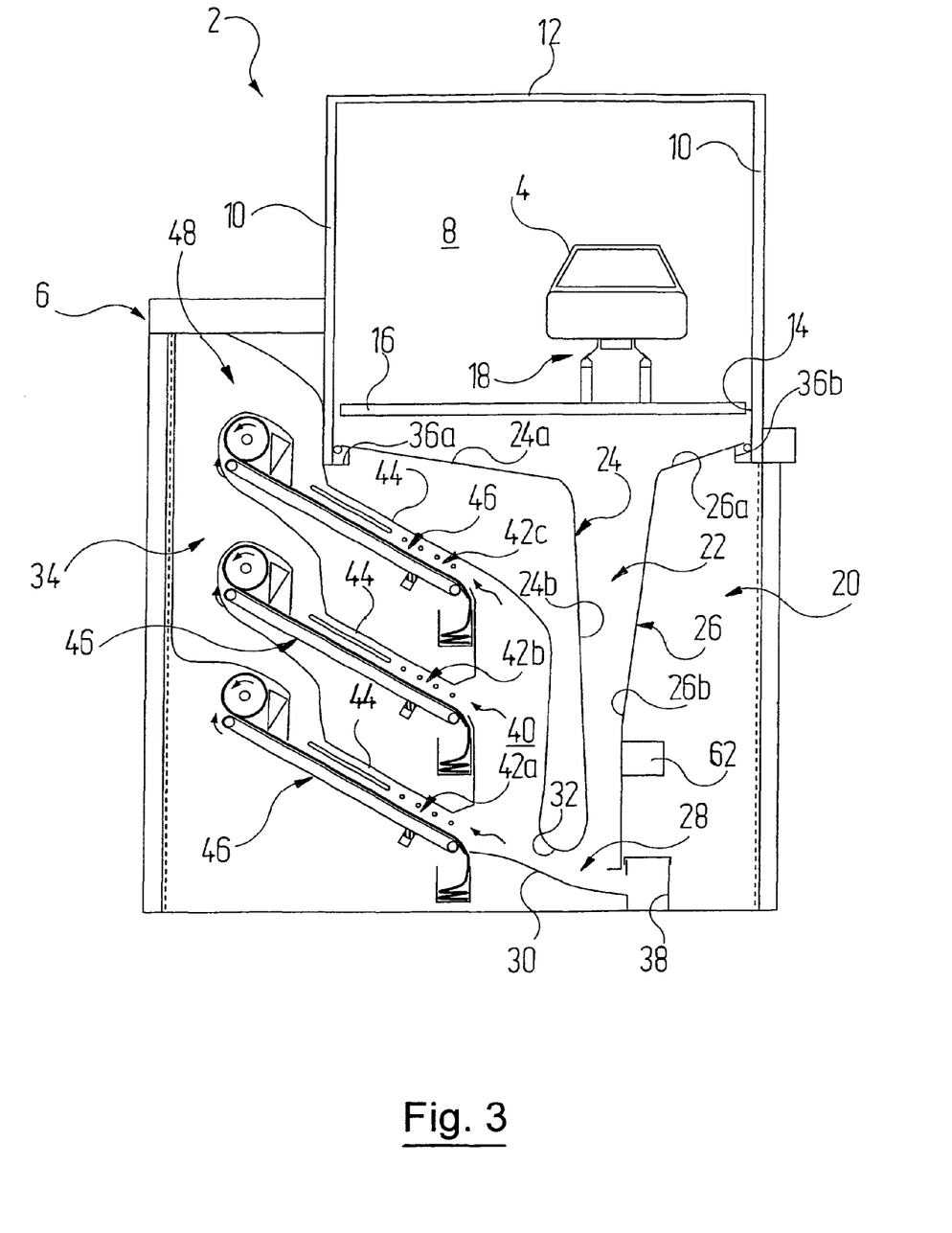
FIG. 3 a view corresponding to FIG. 1 of the paint booth with a modification of the separating device.

FIG. 3 shows the paint booth 2 in which, in a modification of the separating device 48, the respective separating belt 52 of the separating units 46 are arranged such that the respective separating strand 54 is inclined to the horizontal.

The separating strand 54 of the separating belt 52 can essentially assume any angle to the horizontal, possibly even an angle of 90°, so that the booth air flows along the separating units 46 in a vertical direction from bottom to top or from top to bottom. With an angle of between 0° and 90° to the horizontal, the separating units 46 can also be optionally arranged so that the booth air has to flow upwards at an angle or downwards at an angle.

The other components of the separating device 48 are arranged adapted to the position of the separating belts 52 if required.

Figure 4:
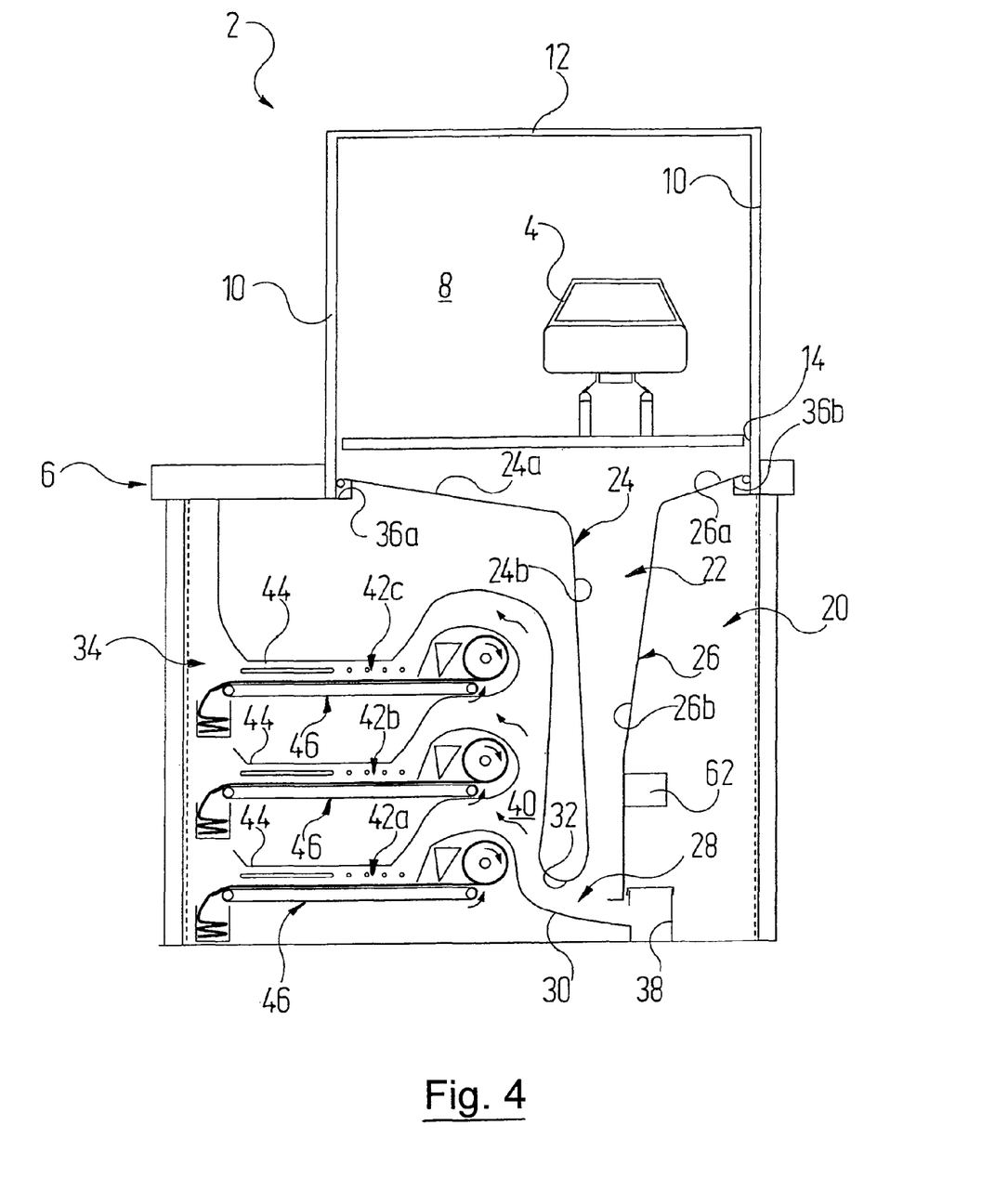
FIG. 4 a view corresponding to FIG. 1 of the paint booth with a further modification of the separating device.

FIG. 4 shows the paint booth 2 in which, in a further modification of the separating device 48, the paper webs 78 are not unwound and conveyed to the collecting tank 94 against the flow direction of the booth air, but in this flow direction. In a further arrangement (not shown specifically here), the separating belts can also be inclined to the horizontal in this case.

Figure 5:
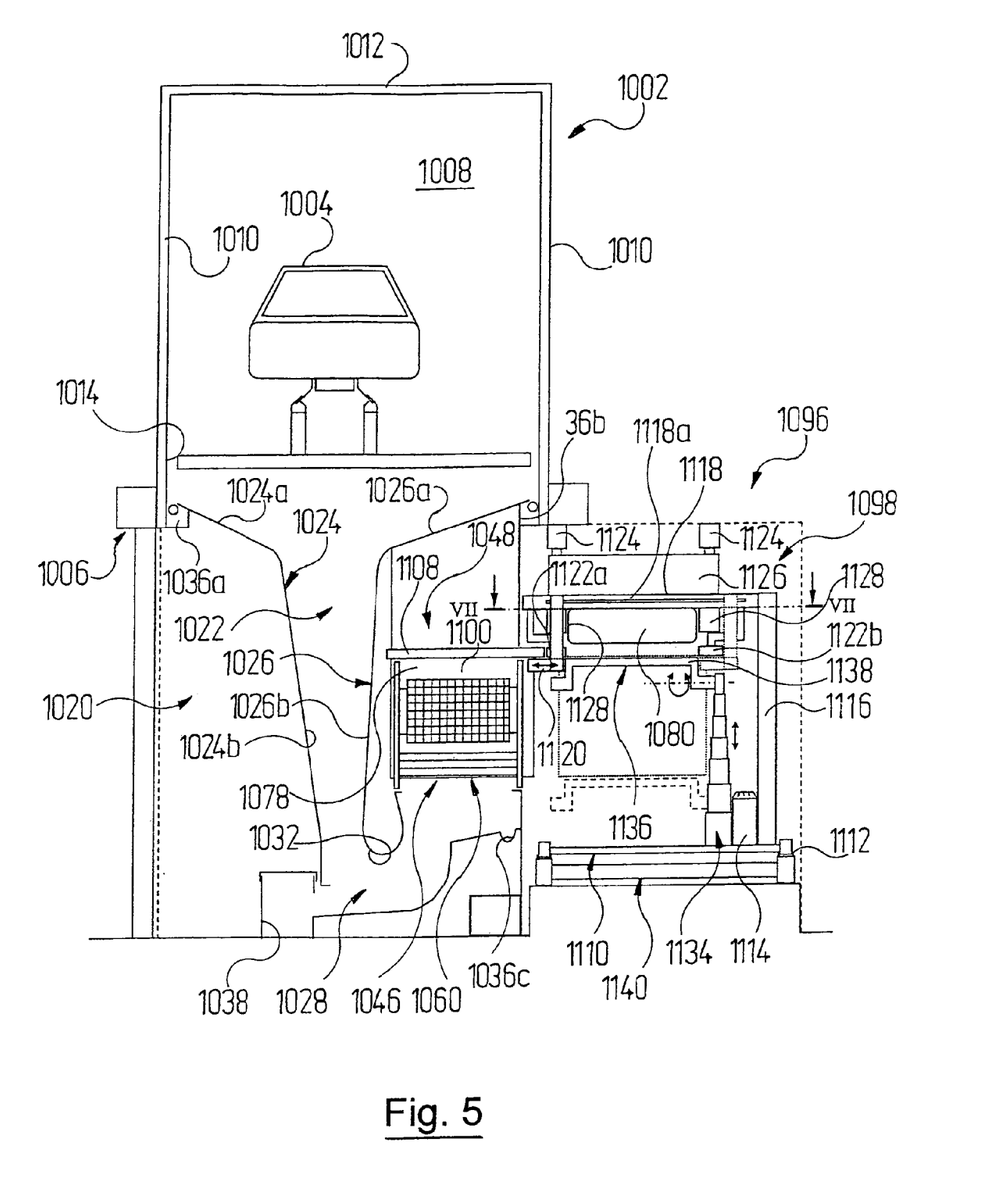
FIG. 5 a view corresponding to FIG. 1 of the paint booth with a second exemplary embodiment of the separating device.

FIG. 5 shows a paint booth 1002 as a further exemplary embodiment. Components which correspond to those of the paint booth 2 according to FIGS. 1 to 4 have the same reference numerals plus 1000.

In the paint booth 1002, the separating device 1048 comprises a separating unit 1046 which is arranged in the system region 1034, and moreover a separating-agent renewal device 1096 which is arranged in a separating-agent renewal region 1098.

Figure 6:
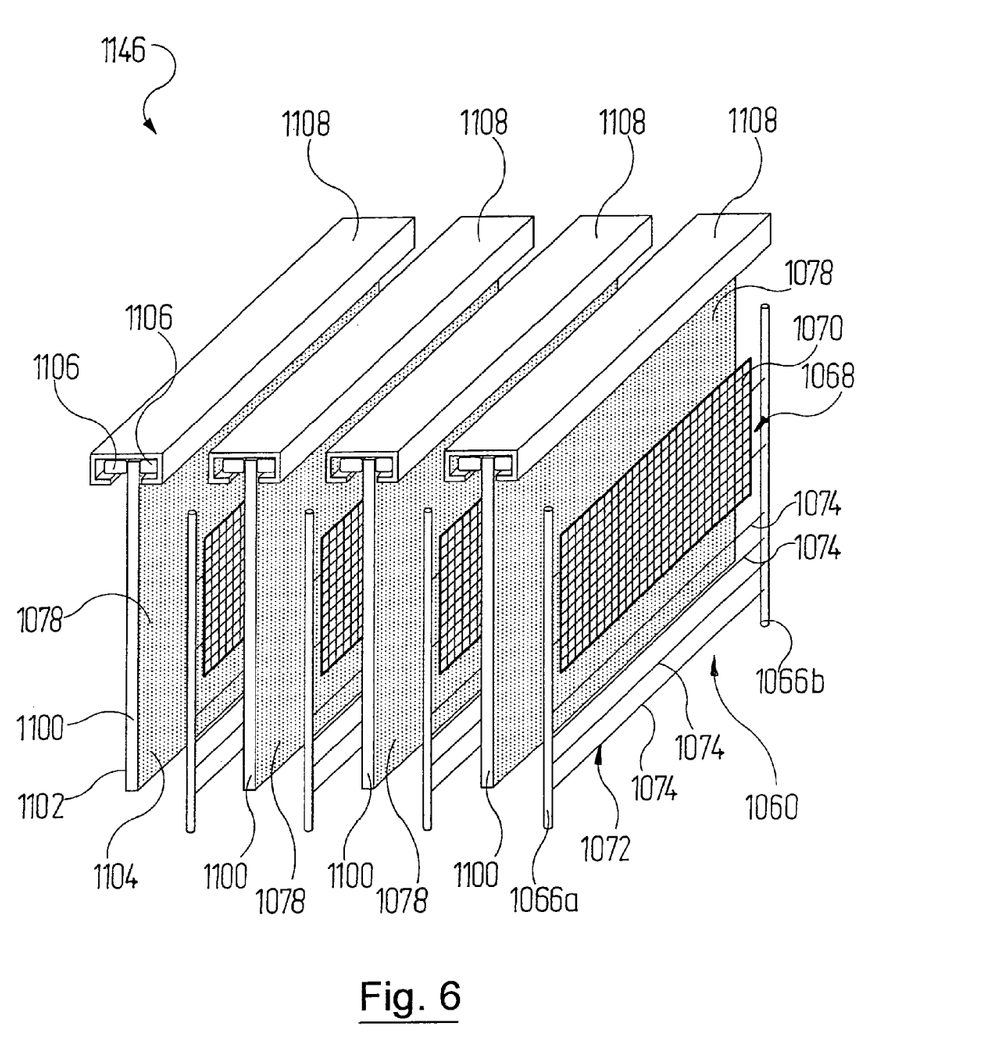
FIG. 6 a perspective view of four separating units and four electrode devices of the separating device of FIG. 5.

The separating unit 1046 comprises a plurality of rectangular separating plates 1100 (of which four are shown in FIG. 6) arranged parallel to one another and in succession. The respective opposing outer faces of the separating plate 1100 form separating surfaces 1102 and 1104 which define a respective separating region and of which only those of the separating plate 1100 shown on the far left in FIG. 6 are provided with reference numerals.

At its upper corner regions, the separating plate 1100 supports a respective roller 1106 on each side, of which two can be seen in each case at one of the corners only in FIG. 6. Also, in FIG. 6 only the rollers 1106 of the separating plate 1100 shown on the far left have reference numerals.

For each separating plate 1100, the separating unit 1046 comprises a respective guide rail 1108 constructed as a profile with a C-shaped cross-section. The guide rails 1108 are arranged horizontally with the opening of the "C" pointing downwards. The separating plates 1100 run with their rollers 1106 in one of the guide rails 1108 in each case and can be moved to the right in FIG. 5 out of the system region 1034 and into the separating-agent renewal region 1098. In their operating position, the separating plates 1100 are arranged in their associated guide rail 1108 in the system region 1034 and are locked therein.

Each separating plate 1100 is covered on both separating surfaces 1102 and 1104 with a respective paper web 1078 which is saturated with adhesive agent 1086.

The separating-agent renewal device 1096 comprises a carriage 1110 which can be moved on a rail pair 1112 which extends in the longitudinal direction of the paint booth 1002 so that the carriage 1110 can be moved along the entire separating unit 1046. The carriage 1110 is driven by means of a motor/control unit 1114. A supporting column 1116 which is carried along by the carriage 1110 holds a guide rail 1118 which is arranged at a height above the guide rails 1108 of the separating unit 1046.

The guide rail 1118 has a lateral guide 1118a in which a clamping shoe 1120 is movably guided, as shown by a horizontal double-headed arrow in FIG. 5. The clamping shoe 1120 is likewise driven by the motor/control unit 1114.

The guide rail 1118 moreover supports two short rail profiles 1122a, 1122b which are arranged at a mutual spacing which is adapted to the spacing of the rollers 1106 at the corners of the separating plates 1100. The spacing between the first rail profile 1122a and a corresponding guide rail 1108 of the separating unit 1046 is small enough here for a separating plate 1100 to be able to move easily out of the guide rail 1108 and into the first rail profile 1122a on its rollers 1106.

The clamping shoe 1120 is arranged below the rail profile 1122a, 1122b and is movably mounted so that it does not collide with the rail profiles 1122a, 1122b or their fixing components during its movement.

Figure 7:
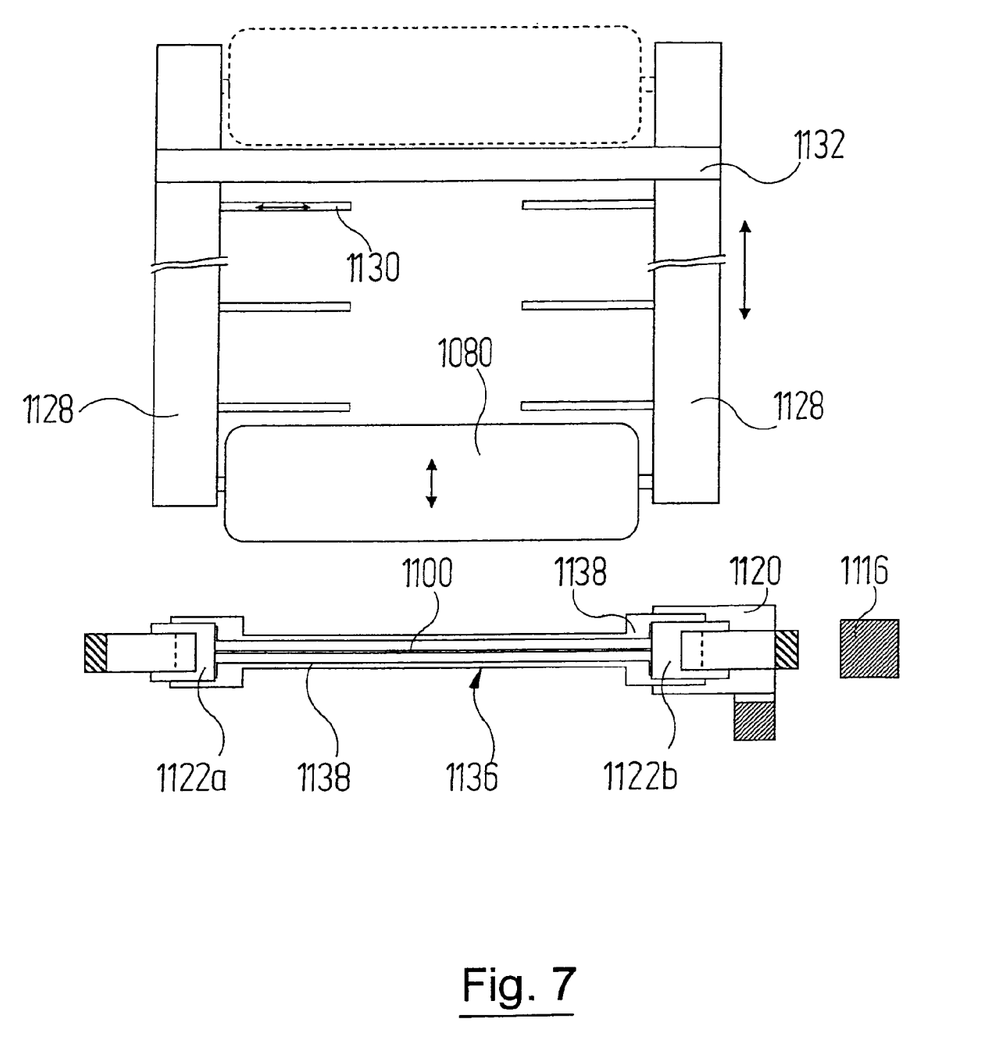
FIG. 7 a section along the section line VII-VII in FIG. 5.

A rail pair 1124 in which a suspended carriage 1126 can be moved extends along the ceiling (merely indicated by dashed lines) of the separating-agent renewal region 1098. This suspended carriage supports two horizontal running rails 1128 on its underside, between which the material roll 1080 can be moved in the longitudinal direction of the paint booth 1002 between two end positions shown in FIG. 7. The spacing between these end positions corresponds approximately to double the vertical extent of the separating plates 1100.

The wound roll 1080 can be unwound during its movement from its first to its second end position in the running rails 1128 and can be simultaneously saturated with adhesive agent 1086 by means of the coating device 1084 (not shown specifically) supported for example by the running rails 1128, so that a corresponding material web 1078 is stretched between the running rails 1128 in a horizontal plane. In order to hold this material web 1078 temporarily, holding pins 1130 can be moved horizontally into the space between the running rails 1128 and back out of this again. This is indicated by a double-headed arrow which is associated with the only holding pin to be provided with a reference numeral. A cutting device 1132 is moreover provided, by means of which a material web 1078 can be cut from the wound roll 1080.

The carriage 1110 furthermore carries a telescopic device 1134 with it, by means of which a stripping device 1136 can be raised and lowered in the vertical direction. The telescopic device 1134 is likewise driven by means of the motor/control unit 1114.

The stripping device 1136 comprises two stripping elements 1138 which can be arranged on both sides of a separating plate 1100 which is moved into the short rail profiles 1122a, 1122b.

The stripping elements 1138 can be folded about a pivot axis (indicated by dot-and-dash lines in FIG. 5) into a stripping position against the stripping plate 1100 or it can be folded away from this into a release position.

Arranged below the rail pair 1112, there is a revolving continuous conveyor belt 1140 which likewise extends in the longitudinal direction of the paint booth 1002 and leads to a collecting region (not shown specifically).

The separating device 1048 of the paint booth 1002 described above now functions as follows:

The overspray-laden booth air is deflected here through the deflection region 1028 in the direction of the separating unit 1046 of the separating device 1048—i.e. to the right in FIG. 5—and flows through between adjacent separating plates 1100 there, with overspray being ionised and separated at the paper web 1078 on the separating plates 1100.

If required, overspray which drops downwards from the separating plates 1100 is taken up by separating fluid flowing over the lower deflector 1030 and guided to the collecting tank 38. To this end, the lower deflector 1030 has a distribution channel 1036c for delivering separating fluid.

The corona current is also an indicator here for the loading of the separating surfaces 1046, 1048 or the paper web 1078 with overspray.

Therefore, if the insulating effect of the separated overspray is too great and/or it is no longer possible to ensure perfect operation of the separating unit, the paper webs 1078 with overspray now adhering thereto are removed from the separating plates 1100 and the separating surfaces 1102, 1104 of the separating plates 1100 are provided with new, unused paper webs 1078.

To this end, the short rail profiles 1122a, 1122b are brought into a position in which the short rail profile 1122a is aligned with the guide rail 1108 of the separating plate 1100 to be cleaned. The carriage 1110 is moved into a corresponding position on the rail pair 1112 for this purpose.

The clamping shoe 1120 is moved forwards in the guide rail 1118 in the direction of the separating plate 1100 where it grips this latter. The above-mentioned locking of the separating plate 1100 in the guide rail 1108 is released. The clamping shoe 1120 is now moved back again, drawing the separating plate 1100 with it.

The separating plate 1100 is moved into a position in which it rests with two of its rollers 1106 in each case in a respective short rail profile 1122*a* and 1122*b*. This position of the separating plate 1100 is shown by dotted lines in FIG. 5.

The stripping elements 1138 of the stripping device 1136 are moved upwards by the telescopic device 1134 and brought into their stripping position. The stripping elements 1138 are then moved downwards. The paper web 1078 adhering to the separating plate 1100 with the overspray separated on it is thus stripped from the separating plate 1100 and falls down onto the conveyor belt 1140.

As mentioned above, the separating agent which has fallen with the overspray from the separating plate 1100 is conveyed by the conveyor belt 1140 to a collecting region. From there, it is supplied for treatment. The overspray-laden material web is supplied for further treatment if required or for disposal as is known per se.

If the stripping elements 1138 assume their lowest position as illustrated by dashed lines in FIG. 5, the separating plate 1100 is now freed of the used paper web 1078 and the overspray adhering thereto.

The stripping elements 1138 are now brought into their release position. The suspended carriage 1126 is moved in the direction of the guide rail 1118, with the running rails 1128 moving in the manner of a fork of a forklift between this and the separating plate 1100 until the separating plate 1100 is located in the centre between the two end positions of the wound roll 1080.

Now, as described above, a paper web 1078 saturated with adhesive agent 1086 is stretched between the running rails 1128. This is cut from the wound roll 1080 by means of the cutting device 1132 and then rests firstly only on the holding pins 1130. These are now retracted so that the paper web 1078 drops downwards onto the separating plate 1100 and, with this, then lies loosely on the two separating surfaces 1102, 1104 thereof.

The paper web 1078 is now pressed against the separating surfaces 1102, 1104 in that the stripping elements 1138 are again guided from top to bottom along the separating surfaces 1102, 1104, for which the contact pressure is less than that of the stripping procedure.

The separating plate 1100 which is now provided with a new and unladen paper web 1078 is then moved back into its associated guide rail 1108 of the separating unit 1046 in that the clamping shoe 1120 is moved in the direction of the separating unit 1046. Once the separating plate 1100 assumes its operating position of its guide rail 1108, it is locked there, whereupon the clamping shoe 1120 releases the separating plate 1100.

This entire procedure can then be repeated with another separating plate 1100 which has to be freed from the paper web 1078 with the overspray adhering to it.

It is to be understood that additional embodiments of the present invention described herein may be contemplated by one of ordinary skill in the art and that the scope of the present invention is not limited to the embodiments disclosed. While specific embodiments of the present invention have been illustrated and described, numerous modifications come to mind without significantly departing from the spirit of the invention, and the scope of protection is only limited by the scope of the accompanying claims.

The invention claimed is:

1. A method for separating overspray from overspray-laden booth exhaust air of coating systems comprising the steps of:
    taking up the overspray by an air stream and conveying the overspray to an electrostatically operating separating device, wherein solids are separated from the overspray at a separating region of at least one separating surface;
    using a cohesive material web as a separating agent, which is arranged, at least partially, along the separating region of the at least one separating surface; and,
    ensuring during operation of the separating device that the material web is electrically conductive, at least in the separating region of the at least one separating surface.

2. The method according to claim 1, wherein the cohesive material web is flexible.

3. The method according to claim 1, wherein the cohesive material web comprises a cellulose material or a plastics material.

4. The method according to one of Claim 1, wherein the cohesive material web is provided with an adhesive agent so that it adheres to the at least one separating surface, at least in the separating region.

5. The method according to claim 4, wherein the adhesive agent a solvent.

6. The method according to claim 5, wherein the adhesive agent comprises a methyl cellulose.

7. The method according to one of claim 4, wherein an electrically conductive adhesive agent is used.

8. The method according to one of claim 1, wherein the cohesive material web is moved intermittently or continuously over the separating region of the separating surface in a flow direction of the air stream or against the flow direction of the air stream.

9. The method according to claim 8, wherein the cohesive material web is unwound intermittently or continuously from a roll.

10. The method according to claim 1, wherein the at least one separating surface extends parallel to a horizontal axis.

11. The method according to claim 1, wherein the at least one separating surface is inclined to a horizontal axis.

12. The method according to claim 1, wherein the at least one separating surface is supplied by a strand of a continuously revolving belt, and wherein the strand faces the air stream.

13. The method according to claim 1, wherein the at least one separating surface is provided by a separating plate.

14. The method according to claim 1, wherein overspray-laden material web portions are supplied to a collecting tank.

15. A device for separating overspray from the overspray-laden booth exhaust air of paint systems comprising:
    a) at least one separating surface along which the booth exhaust air can be conveyed and which provides a separating region and which is connected to a terminal of a high voltage source;
    b) an electrode device which is arranged in the booth exhaust air, and which is associated with the separating surface and which is connected to the other terminal of the high voltage source; and,
    c) a cohesive material web arranged as a separating agent at least partially along the separating region of at least one separating surface, wherein the cohesive material web is kept electrically conductive, at least in the separating region of the at least one separating surface, during operation of the separating device.

16. The device according to claim 15, wherein in that the cohesive material web is flexible.

17. The device according to claim 15, wherein the cohesive material web is made from a cellulose material or a plastics material.

18. The device according to claim 15, wherein the cohesive material web is provided with an adhesive agent by means of a coating device so that the cohesive material web adheres to the at least one separating surface.

19. The device according to claim 18, wherein the adhesive agent comprises a solvent.

20. The device according to claim 19, wherein the adhesive agent comprises a methyl cellulose.

21. The device according to claim 18, wherein the adhesive agent is electrically conductive.

22. The device according to claim 15, wherein the cohesive material web is moved intermittently or continuously in a flow direction of the booth exhaust air or against the flow direction of the booth exhaust air over the separating region of the separating surface by means of a supply device.

23. The device according to claim 21, wherein the cohesive material web is unwound intermittently or continuously from a roll by means of the supply device.

24. The device according to claim 15, wherein the at least one separating surface extends parallel to a horizontal axis.

25. The device according to claim 15, wherein the at least one separating surface is inclined to a horizontal axis.

26. The device according to claim 15, wherein the at least one separating surface is provided by a strand of a continuously revolving belt, wherein the strand faces the booth exhaust air.

27. The device according to claim 15, wherein the at least one separating surface is an outer surface of a separating plate.

28. A system for coating objects comprising:
  a) a coating booth in which the objects are acted upon by coating material and through which an air stream is conducted which takes up and removes overspray particles of the coating material; and,
  b) an electrostatically operating separating device, wherein the electrostatic separating device is constructed according to claim 15.

* * * * *

UNITED STATES PATENT AND TRADEMARK OFFICE
CERTIFICATE OF CORRECTION

| | |
|---|---|
| PATENT NO. | : 9,073,079 B2 |
| APPLICATION NO. | : 13/515847 |
| DATED | : July 7, 2015 |
| INVENTOR(S) | : Schulze et al. |

It is certified that error appears in the above-identified patent and that said Letters Patent is hereby corrected as shown below:

In the Claims

At column 12, line 66, in line 1 of claim 16, after the word "wherein" the phrase "in that" should be deleted.

Signed and Sealed this
First Day of March, 2016

Michelle K. Lee
*Director of the United States Patent and Trademark Office*